Dec. 17, 1940.  A. M. LEWIS ET AL  2,225,176

HAMBURGER GRILL

Filed Jan. 27, 1939  2 Sheets-Sheet 1

INVENTORS
ALBERT M. LEWIS
BY PETER B. WEILER
ATTORNEY.

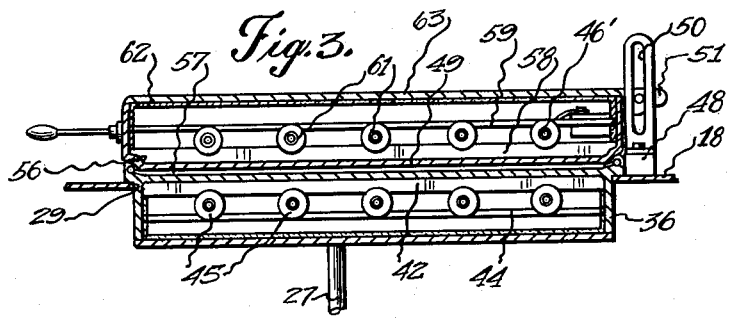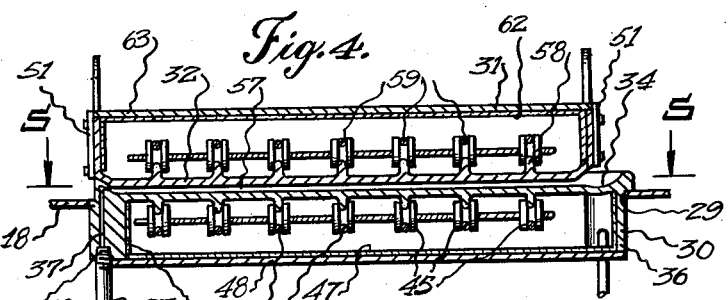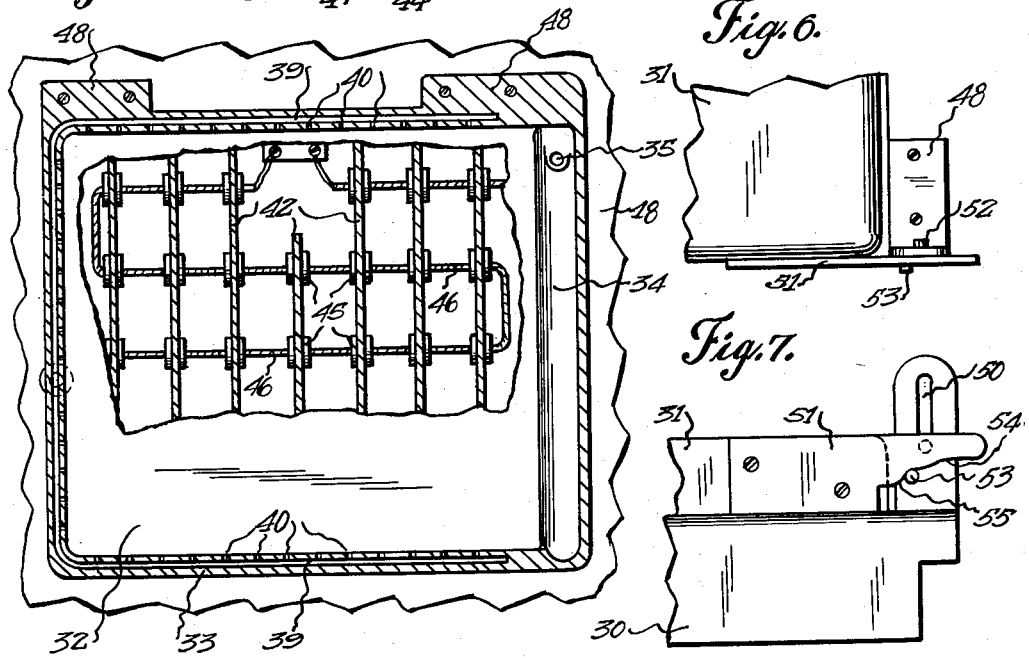

Patented Dec. 17, 1940

2,225,176

UNITED STATES PATENT OFFICE 2,225,176

HAMBURGER GRILL

Albert M. Lewis and Peter B. Weiler, Detroit, Mich.

Application January 27, 1939, Serial No. 253,076

2 Claims. (Cl. 53—5)

Our invention relates to a new and useful improvement in a grill adapted primarily for use in cooking hamburger patties or steaks formed from ground meat and flattened out into a flat formation. From the description of the invention, it will also appear that the invention may be used for grilling purposes generally, and particularly for grilling meats and the like. Experience has shown, particularly in the use of a grill on which hamburger patties are cooked, that the cooked product frequently is coated with a hard outer shell which renders it less palatable. Experience has also shown that, while the outer surface of the pattie may be cooked, the inner body thereof will not be cooked and it is an object of the present invention to provide a grill mechanism on which meats may be grilled without over-cooking the outer surface and with a thorough cooking of the insides thereof.

It is another object of the present invention to provide a grill of this class so constructed and arranged that steam may be delivered to the article being cooked at the time it is being cooked.

Another object of the invention is the provision of a grill of this class having a surface on which the article to be cooked is placed and provided with means of conveying therefrom excessive grease, which may either be deposited thereon or accumulated during the cooking operation.

Another object of the invention is the provision of a grill of this class having a pair of parts, hingedly connected together, each provided with a heating plate, so arranged and constructed that when one part is closed upon the other there will be a slight space between the heating plates, thus making it possible to grill at the same time both sides of the food being grilled between these plates.

Another object of the invention is the provision of a grill of this class having a pair of parts swingable, relatively, to each other, but each provided with a grill plate and the structure so arranged that, when one part is swung onto the other for the cooking operation, a chamber will be provided between the plates, into which steam may be admitted when desired.

Another object of the invention is the provision of a device of this class which will be simple in structure, economical of manufacture, durable, compact, highly efficient in use and easily and quickly operated.

Another object or objects will appear hereinafter.

The invention consists in the combination and arrangement of parts hereinafter described and claimed.

The invention will be best understood by a reference to the accompanying drawings, which form a part of this specification and in which:

Figure 3 is a sectional view taken on a line 3—3 of Figure 1.

Figure 4 is a sectional view, slightly enlarged, taken on line 4—4 of Figure 3, with parts broken away.

Figure 5 is a sectional view of the lower section taken on line 5—5 of Figure 4, slightly enlarged with parts broken away.

Figure 6 is a fragmentary top plan view illustrating the hinge used in the invention.

Figure 7 is a fragmentary side elevational view illustrating the hinge used in the invention.

Figure 1:
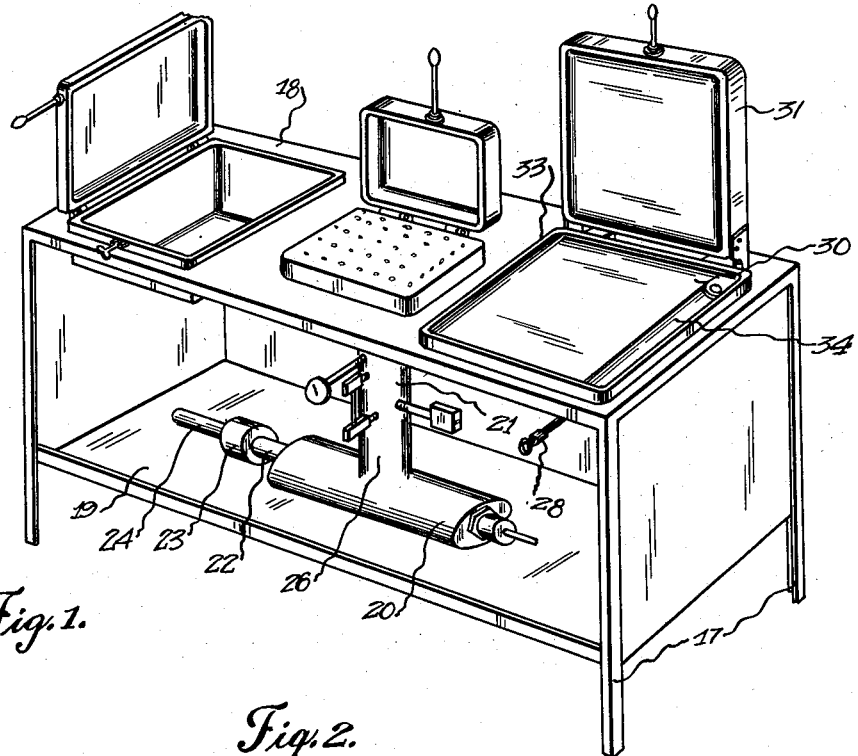
Figure 1 is a perspective view of a structure embodying the invention.

In Figure 1, I have illustrated a construction in which the invention is embodied, the present invention forming a part of the general assembly. As shown in the drawings, a table top 18 and a partition 19 are supported by suitable legs 17. Resting upon the partition 19 is the crosshead 20 of a boiler, projecting centrally upward from which is a standpipe 26, which serves as a steam dome. A feed pipe 22 connects with the cross head 20 through one end thereof. This feed pipe 22 communicates through the feed pipe 23 with a water delivery pipe 24. The steam dome 21 is connected to a steam delivery pipe 27, in which is positioned a control valve 28.

Formed in the table top 18 is an opening 29 in which seats the lower section 30 of the grill, hingedly mounted on which is the upper section 31 of the grill.

The lower section of the grill is provided with a grill plate 32, extending around which is a lip or bead 33. A channel 34 which serves as a grease drain extends along one side of and is formed in the upper surface of the plate 32. This channel 34 communicates with an opening 35 from which the grease may be led off into a pan or suitable conduit.

A depending apron 36 projects downwardly from the plate 32 and engages in the opening 29. Three sides of this apron are formed of greater thickness than the remaining side and a passage 37 is formed in one of the thick sides of the apron communicating on one end with a threaded socket 38 into which is adapted to be threaded the steam delivery pipe 27. The passage 37 communicates in its upper end with a passage 55

39 which extends around three sides of the apron and communicating with which is a plurality of spaced openings 40.

Depending from the under surface of the plate 32 is a plurality of spaced ribs 42 each in alignment with and spaced from a supporting rod 44. Positioned between these rods and the ribs 42 and in spaced relation to each other are insulating spools 45, through which is threaded the heating element 46 the end of which is suitably connected to terminals adapted for being connected to a source of electrical energy. Cover 48 is mounted on the apron 36 to enclose this heating element, the cover being provided on its inner side with a layer of insulation 47. The inner face of the apron is also provided with a layer of insulation 47'.

Mounted on and projecting upwardly from the section 30, adjacent opposite sides of the rear edge thereof are lugs 48. Mounted on opposite sides of the rear of section 31 are plates 51 having a portion extending upon the rear side of the section 31. This rearwardly projecting portion of the plates 51 carries a laterally projecting stud 52 which extends through an elongated vertically directed slot 50 formed in the lugs 48 so as to swingably mount the section 31 on the section 30. Projecting outwardly from the outer face of each of the lugs 48 is a stud 53 which serves as a stop and against which will slideably engage a face of the projecting portion of the plate 51, this face having a plurality of recesses 54 and 55 formed therein, so that, as the section 31 is swung upwardly, the section will be retained in its elevated position through the engagement of the stop 52 in the recesses.

Figure 2:
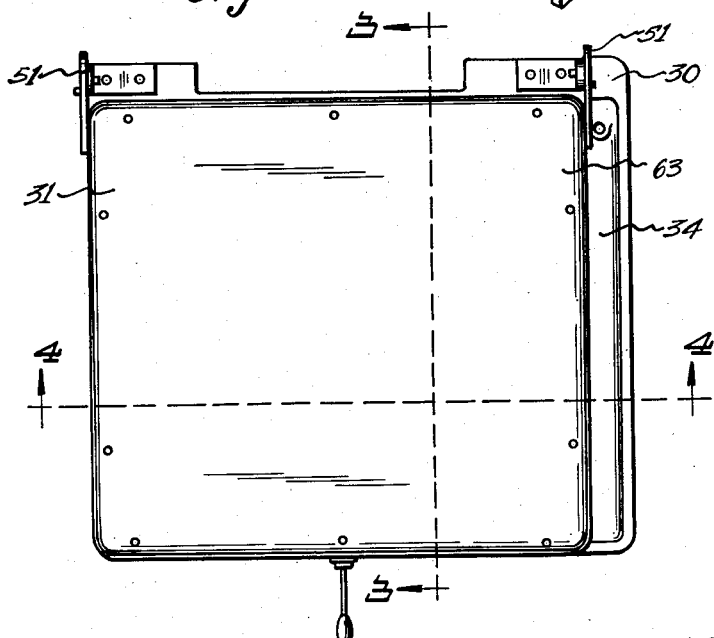
Figure 2 is a top plan view of the invention.

The section 31 is provided with a grill plate 49, having the curved portion 56 adapted for engagement with the pad or rim 33, so that there is formed between the plates 49 and 32 a chamber 57. Projecting inwardly from the inner face of the plate 49 and extending parallel in spaced relation to each other are lips 58 in alignment with which are retaining or supporting rods 59 to support or retain the insulating spools 61 in spaced relation, a suitable heating element 46' being threaded through these spools as in the lower section 30. A covering 63 serves to enclose the heating element in the upper section. The inner face of the cover 63 and the inner surface of the side walls of this section being insulated by the insulation 62. The construction is such that, when the article to be cooked is placed upon the upper surface of the plate 32, the upper section 31 may be swung downwardly into the position shown in Figures 2 and 3 so that the article being cooked is contained in the chamber 57. The heating elements in the sections 30 and 31 are in the plates 32 and 49 and are sufficiently hot for cooking purposes. When desired, the operator by opening the valve 28 may admit dry steam from the steam dome 26 into the passage 39 from which it will issue through the opening 40 into the chamber or space 57, thus moistening the food and serving to penetrate it so as to thoroughly cook the interior thereof. When this steam is admitted it will be directed inwardly toward the article being cooked and the excess will flow into the drain channel 34 and any excess grease will thus be removed from around the food and deposited in the channel 34, thus preventing the food from becoming greasy or unpalatable during the cooking operation.

The construction illustrated is one which is believed durable and possessed of all of the advantages enumerated and it is believed obvious that it may be easily operated.

While we have illustrated and described the preferred form of construction, we do not wish to limit ourselves to the precise details of structure shown, but desire to avail ourselves of such variations and modifications as may come within the scope of the appended claims.

What we claim as new is:

1. A grill device of the class described, comprising: a pair of co-operative relatively movable grill plates, said plates being movable into operative and inoperative relation; a bead extending along the edge of one of said plates, said plates being spaced apart upon movement into operative relation, said bead aligning with said space and having a number of outlet openings formed therein, communicating with a passage formed in said bead; and means for conducting steam into said passage.

2. A grill device of the class described, comprising: a pair of relatively movable grill plates, movable into operative and inoperative relative positions, and there being a space between said plates upon movement of the same into operative relative position; a heating element for heating said plates, one of said plates having a passage formed therein, communicating with outlet openings, directed into said space; and means for delivering steam into said passage.

ALBERT M. LEWIS.
PETER B. WEILER.